No. 776,492. PATENTED DEC. 6, 1904.
F. A. BROWNELL.
WOODWORKING MACHINE.
APPLICATION FILED JUNE 10, 1897.
NO MODEL. 5 SHEETS—SHEET 1.

Witnesses. Inventor.
G. Willard Rich. Frank A. Brownell
Grace A. Koda. J Church Church
Attorneys

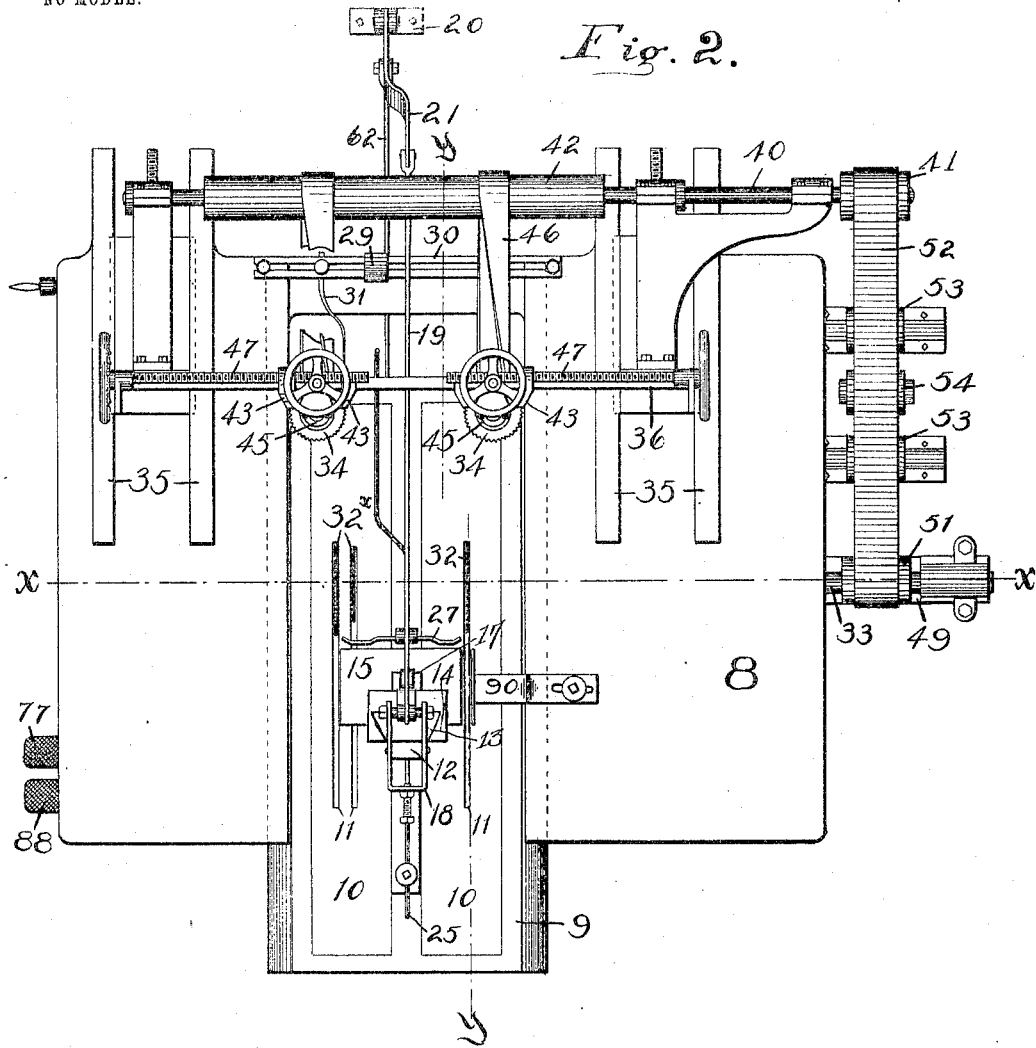

No. 776,492. PATENTED DEC. 6, 1904.
F. A. BROWNELL.
WOODWORKING MACHINE.
APPLICATION FILED JUNE 10, 1897.
NO MODEL. 5 SHEETS—SHEET 3.
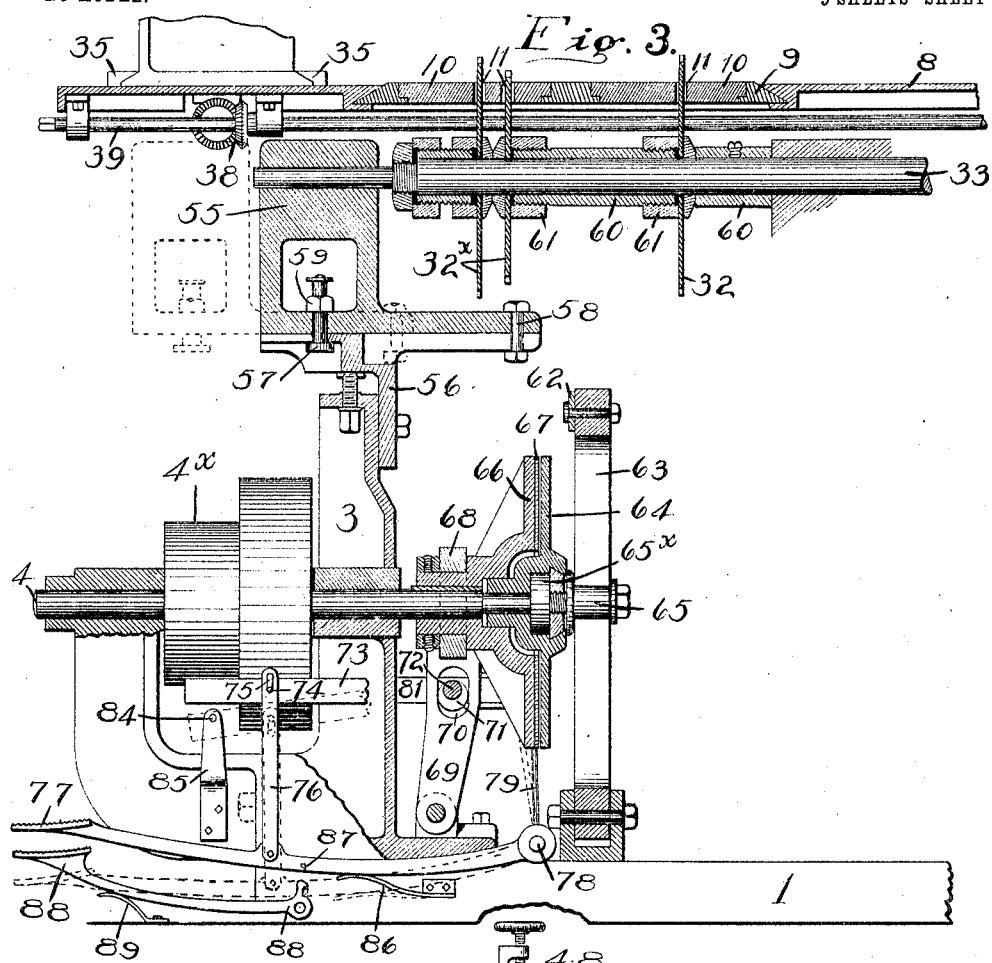
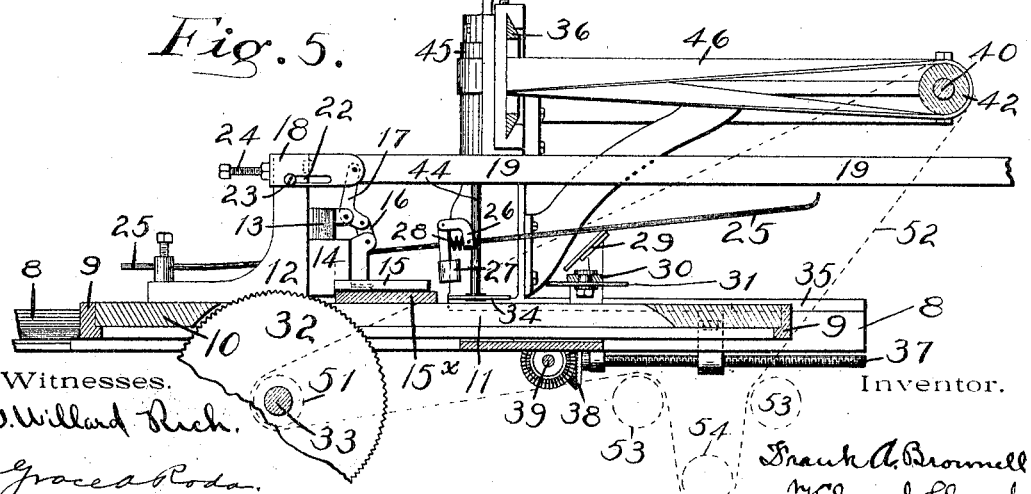
Witnesses. Inventor.
G. Willard Rich. Frank A. Brownell
Grace A. Roda. by Church & Church
his Attorneys No. 776,492. PATENTED DEC. 6, 1904.
F. A. BROWNELL.
WOODWORKING MACHINE.
APPLICATION FILED JUNE 10, 1897.
NO MODEL. 5 SHEETS—SHEET 4.
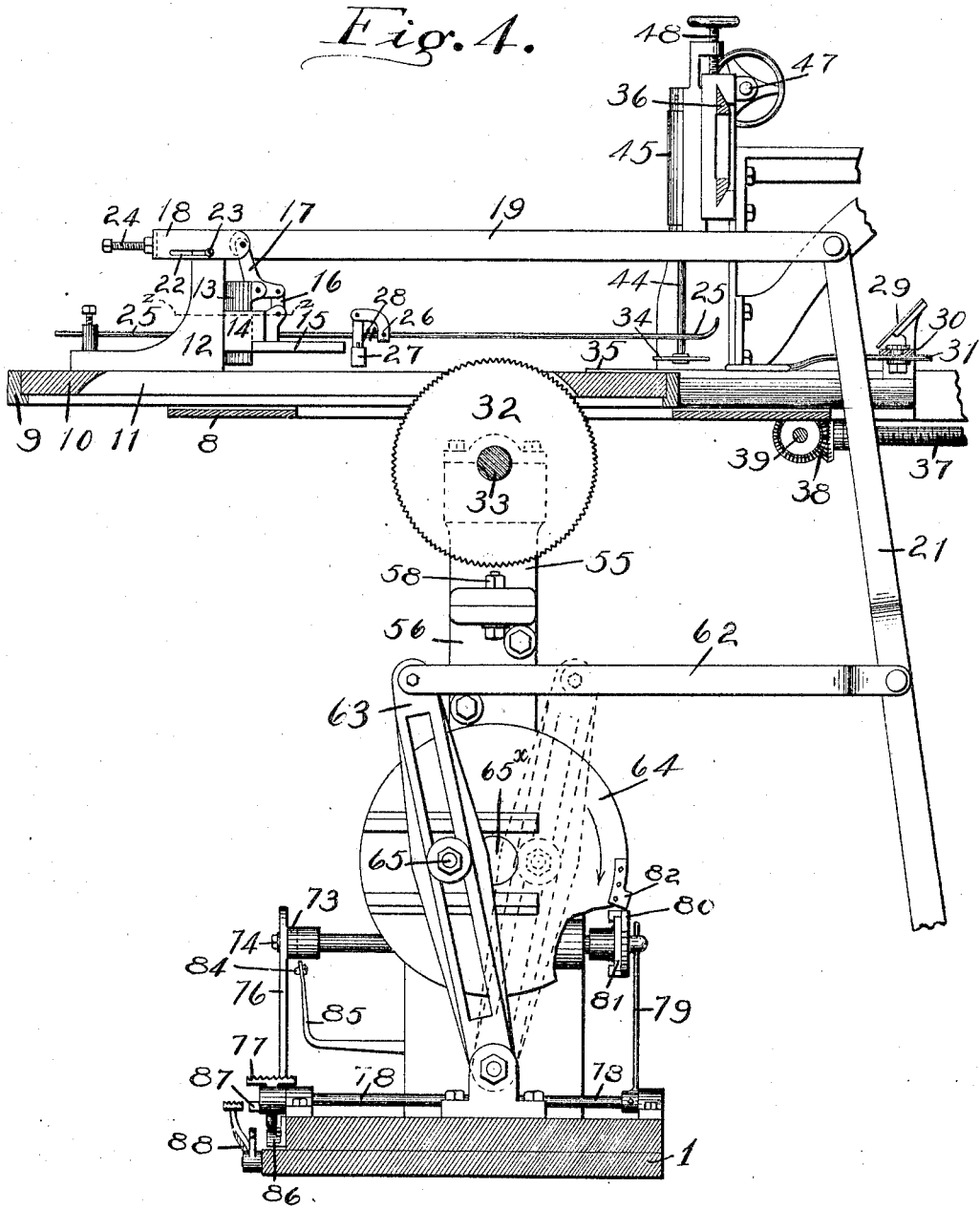
Witnesses.
Inventor.
Attorneys No. 776,492. PATENTED DEC. 6, 1904.
F. A. BROWNELL.
WOODWORKING MACHINE.
APPLICATION FILED JUNE 10, 1897.
NO MODEL. 5 SHEETS—SHEET 5.
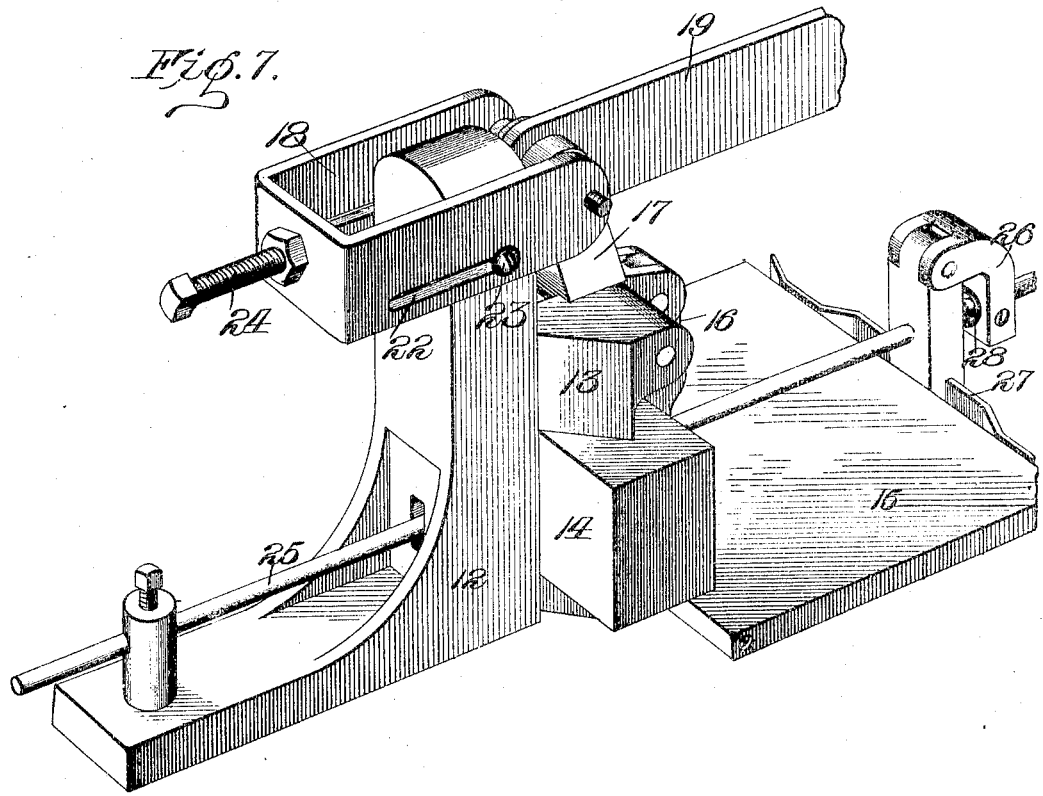
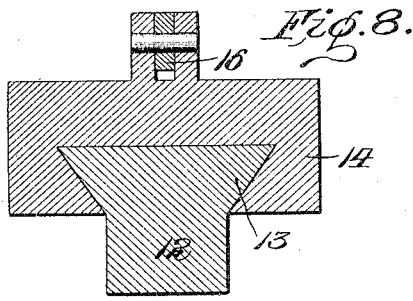

No. 776,492. Patented December 6, 1904.

UNITED STATES PATENT OFFICE.

FRANK A. BROWNELL, OF ROCHESTER, NEW YORK.

WOODWORKING-MACHINE.

SPECIFICATION forming part of Letters Patent No. 776,492, dated December 6, 1904.

Application filed June 10, 1897. Serial No. 640,267. (No model.)

*To all whom it may concern:*

Be it known that I, FRANK A. BROWNELL, of Rochester, in the county of Monroe and State of New York, have invented certain new and useful Improvements in Woodworking-Machines; and I do hereby declare the following to be a full, clear, and exact description of the same, reference being had to the accompanying drawings, forming a part of this specification, and to the reference-numerals marked thereon.

My present invention has for its object to provide a woodworking-machine particularly adapted for sawing and grooving small boards or other articles and which will be nearly automatic in its operation, simply requiring the services of an unskilled operator; and to these and other ends it consists in certain improvements hereinafter described, the novel features being pointed out particularly in the claims at the end of this specification.

Figure 1:
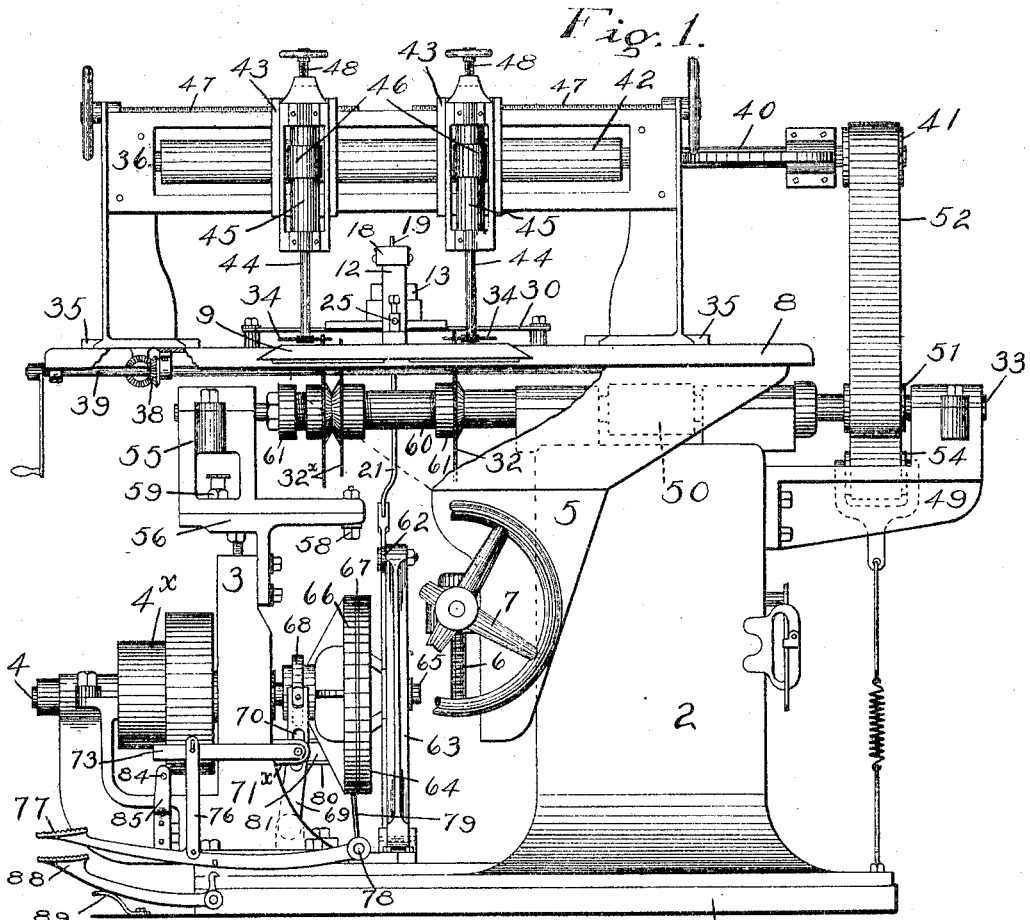
Figure 6:
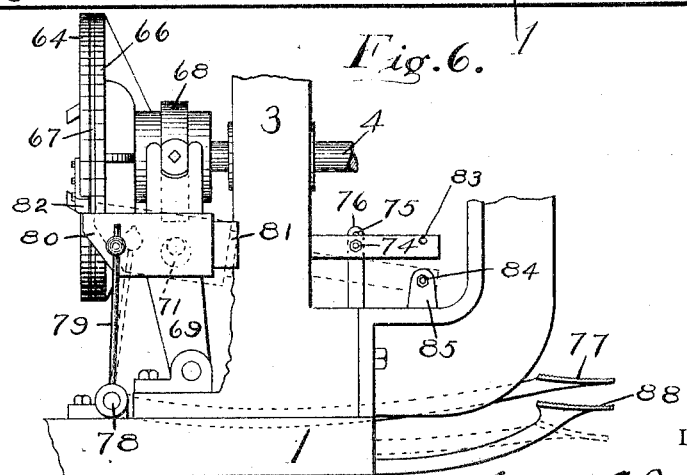

In the drawings, Figure 1 is a front elevation of a machine constructed in accordance with my invention; Fig. 2, a plan view of the same; Fig. 3, a sectional view on the line $x\,x$ of Fig. 2; Fig. 4, a similar view on the line $y\,y$ of Fig. 2; Fig. 5, a view similar to Fig. 4, showing the parts in another position; Fig. 6, a detail view of the clutch mechanism, showing the opposite side from that exhibited in Fig. 1. Fig. 7 is a perspective view of the clamping device, and Fig. 8 a sectional view on the line $z\,z$ of Fig. 4.

Similar reference-numerals in the several figures indicate similar parts.

The main frame of the machine embodies a base portion 1, upon which is arranged a standard 2, preferably hollow, for the passage of the driving-belt to a counter-shaft beneath the floor, and said base is further provided with a standard 3, upon which is mounted an adjustable support or bearing for the free end of the arbor or shaft 33, carrying saws or other tools, as will be explained. In the standard 3 is also journaled a driving-shaft 4, operating the work-feeding devices.

5 indicates a frame vertically movable and adjustable upon the standard 2 by any suitable devices, such as the screws 6 and hand-wheel 7, said frame having at its upper end a table 8, provided with dovetail ways, in which operates a reciprocating work-table or carriage 9, upon which the boards or pieces of material operated upon are held, as will be described. This movable table or slide 9 is preferably in skeleton form and is adapted for the reception of filling-pieces 10, preferably of wood, and held upon the skeleton table in any suitable manner, said filling-pieces being provided with slots 11, through which the vertically-operating saws or equivalent rotary tools project. Mounted upon the central rib of the table 9 is a bracket 12, constituting a stop for the work and provided with a forwardly-extending dovetail portion 13, upon which is arranged a vertically-movable slide 14, (see Fig. 8,) having a removable foot or plate 15 and connected by a link 16 with a bell-crank lever 17, pivoted on the extension 13 and pivotally connected at its upper end to a yoke 18, passing around the upper end of the bracket 12, and said lever 17 is also connected by a link 19 to the upper end of a lever 21, pivoted to a bracket 20 on the floor or any other suitable support. The yoke 18 is provided with slots 22 in its sides, through which pass guiding studs or screws 23, and the rear side of the yoke is provided with an adjustable stop-bolt 24, adapted to limit the movement of said yoke relative to the top of the bracket 12. From this construction it will be seen that when the lever 21 is moved from the position shown in Fig. 4 toward the rear of the machine the presser-foot 15 will be moved down, clamping any material, as a board $15^\times$, Fig. 5, that may be between it and the reciprocating table, so that the board will be held and the table withdrawn toward the rear, carrying the board between the various tools operating upon it, thereby not only moving the table, but clamping the material firmly to it, and when the lever 21 is moved in the opposite direction the link 19 will press the bell-crank 17 backward, first lifting the presser-foot 15 and then sliding the whole table backward to the position shown in Fig. 4, the first portion of the operation releasing the board or article and the next moving the frame backward.

Mounted upon the sliding table is a spring-rod 25, preferably secured to the rear of the bracket 12 and extending forward over the clamp or presser-foot and toward the rear of the machine, said rod having upon it an adjustable sleeve 26, carrying a pivoted gage 27, adapted to coöperate with the front edge of the board $15^\times$, held beneath the presser-foot, and between said gage and the sleeve is arranged a spring 28, operating to move said gage toward the clamp. The rear end of the rod 25 is preferably slightly upturned, as shown, and as the table or carriage moves to the rear this rod will engage with an inclined plate 29, adjustably secured upon a slotted plate 30, thereby lifting the rod and withdrawing the gage from in front of the block or board. Also adjustably secured to the slotted plate 30 are spring-arms 31, which are set with their free ends a sufficient distance apart to engage the ends of the block or piece operated upon and hold it after said block has been pushed between them by the movement of the table or frame 9. This construction is such that as the board is clamped and moved to the rear between and over the saws or other operating-tools the spring-operated gage 27 will hold it against the bracket 12, which acts as a stop, until firmly clamped during the rearward movement of the table, and then the gage will be moved out of the way by the engagement of the rod 25 and plate 29, thereby allowing the clamping device to push the block or board between the retaining-arms 31, which block will remain in position as the gage is held out of engagement by the plate 29, while the table or frame is moved forward again, the resiliency of the rod 25 bringing the gage in position in front of the clamp again as soon as its end leaves the plate 29.

The tools for operating upon the wood or block thus held may be of any suitable construction—such, for instance, as circular saws or rotary cutters 32 $32^\times$, secured upon an arbor 33 beneath the table, as presently described—and in addition to this I prefer to employ two horizontally-rotating tools, as small saws 34, and will first describe the construction and the manner of operating the latter.

Formed upon or secured to the main table or frame 8 are ways or guides 35, adapted to receive the correspondingly-shaped feet of a frame 36, adjustable back and forth in said ways by means of screws 37, operated through beveled gears 38 from a manually-operated shaft 39 beneath the main frame or table. Mounted in suitable bearings in the frame 36 is a shaft 40, having at one end a driving-pulley 41 and near the center of the machine a belt-pulley or drum 42. Mounted upon a portion of the frame 36 extending over the movable feed-table are frames 43, carrying vertical arbors 44, to the lower ends of which the saws or rotary tools 34 are attached in any suitable manner. The arbors 44 are provided with pulleys 45, around which pass quarter-turn belts 46, also passing around the pulley or drum 42, as shown in Fig. 2, so that the saws are driven from the shaft 40. The lateral adjustments of the frames 43, carrying the arbors, may be accomplished by suitable screws 47 and the vertical adjustments by vertically-operating screws 48, or other suitable devices may be employed for the purpose.

The arbor 33, carrying the saws or tools 32 $32^\times$, (mounted in bearings in the upper end of the standard 2 and in a bracket 49, secured thereto,) is provided with a driving-pulley 50 and also with the belt-pulley 51, around which passes a belt 53, extending over pulley 41, idlers 53, and a tightener-pulley 54, as shown particularly in Figs. 1, 2, and 5. The extreme end of the arbor 33 is preferably reduced and has a bearing in a block or bracket 55, movable upon a frame 56, adjustably connected to the standard 3 of the main frame, the connection between the block 55 and frame 56 being accomplished by providing bolts 57 and 58, the shanks of which operate in slots formed in the frame 56 and the bolt 57 having a movable nut 59 operating to clamp the parts rigidly in the position shown in full lines in Fig. 3 and when said nut is loosened permitting the block 55 to be moved out to the position shown in dotted lines in said figure to permit access to the end of the arbor and allow the removal or adjustment of the saws thereon. The saws or tools 32 $32^\times$ may be secured upon and spaced by any suitable means, such as sleeves 60 and nuts 61 on the ends thereof, as shown particularly in Fig. 3.

As stated, the movement of the work-holding clamp and table is caused by the oscillation of the lever 21, and while this may be accomplished by any suitable means I prefer to connect it to a link 62, pivoted to a slotted lever 63, which in turn is pivoted upon a suitable bracket upon the base of the frame, and I provide a rotary disk 64 with an adjustable crank-pin 65, operating in the slot in said lever, so that by the rotation of the disk the lever will be oscillated on its pivot and by moving the pin 65 the length of the stroke may be adjusted as desired.

In a device of this description it is desirable that the machine be capable of being arrested when the work-table is forward and in position for the application of the board or block, and I therefore provide a suitable clutch between the rotary shaft operating the disk 64 and said disk. The disk 64 is mounted loosely upon the end of the shaft 4, a head or ring $65^\times$ preventing its outward movement, and upon said shaft are also mounted driving-belt pulleys $4^\times$, by which the shaft may be driven from any suitable source of power.

66 indicates a friction-disk keyed to the shaft 4 and revolving with it, the face of said disk in proximity to the disk 64 being covered with leather 67 or other suitable material.

68 indicates a collar loose on the hub of the disk and connected to a shifting lever 69, pivoted to the base of the machine. This lever 69 is provided with a slot 70, in which is arranged a cam 71 on a shaft 72, journaled in a bearing 71× and having at one end an arm 73, provided with a pin 74, operating in a slot 75 in a link 76, pivoted to a foot-lever 77, which latter is attached to a rock-shaft 78, journaled in suitable bearings at the base of the frame. Connected to one end of the shaft 78 is a rock-arm 79, connected to a sliding shoe or stop 80, longitudinally movable upon an arm 81, attached to the cam-shaft 72. The end of this stop or shoe 80 is adapted when projected to coöperate with a corresponding stop 82, formed on or attached to the periphery of the disk 64, so that when said two stops are in engagement the disk will be arrested with the parts in the position in full lines in Fig. 4. The rear end of the arm 73 is provided with a small recess or depression 83, with which is adapted to coöperate a corresponding projection 84 on the end of a spring-arm 85 (see Figs. 3 and 4) to hold said arm 73, temporarily at least, in the position shown in dotted lines in Fig. 3, the friction between these parts being easily overcome, as will be explained.

The treadle or lever 77 is adapted to be raised by a spring 86, and said treadle is also provided with a lug 87, with which coöperates a catch or projection formed upon a treadle 88, pivoted upon the frame and adapted to be raised by a spring 89 when the catch is released. It will be understood that the actuating-spring 86, frictional retainer 85, and the catch could be replaced by any suitable devices which would operate to hold the clutch members in and out of engagement and would yield when they were operated by the engagement of the stops. The operation of this portion of my invention is as follows: When the clutch devices are disengaged and the feeding and table-reciprocating mechanism is at rest, the parts are in the position shown in full lines in all of the figures, the stops 80 and 82 being in engagement and the clutch-disks being disconnected, and when it is desired to start the machine the operator presses down on the treadle 77 and the catch-lever 88 retains the parts in the position shown in dotted lines. The first movement of the lever 77 withdraws the stop 80 from beneath the stop 82, and the end of the slot in the link 76 then draws down the arm 73, turning the shaft 72 and forcing the clutch-disks in engagement, and the end of the arm 73 engages the spring-arm 85 with sufficient friction to hold the parts in this position. The connection will cause the operation of the work-clamp and feed-table in the manner described, feeding the boards to the operating-tools and releasing them by the backward movement of the feed-table, while the spring-arms 31 hold the last pieces and the preceding ones are pushed off the rear of the table or otherwise suitably removed. When it is desired to stop the operation of the feeding devices, the operator presses upon the treadle 88, releasing the treadle 77, which is then thrown upward by the spring 86, the first operation of the treadle throwing the stop 80 forward in the path of the stop 82 on the disk, and the movement of the latter then turns the shaft 72 so that the spring-arm 85 is disengaged and the cam 71 operates the movable clutch-section backward, disengaging the parts. When the treadle 77 is released from engagement with the hook on the treadle 88, the former is moved upward by the spring 86 a distance equal to the length of the slot 75 in the link 76. This movement is transferred through the shaft 78 to the rocker-arm 79, causing the stop 80 to be moved outward upon the arm 81, whereby the stop 82 is arrested in its revolution and the parts returned to their normal position, as above described.

In the construction shown herein the saws 32 are arranged to sever the material into definite lengths, the blocks or boards to be sawed being moved beneath the clamp until arrested by an adjustable gage or stop 90 on the stationary table 8, as shown in Fig. 2, and the saw 32× is arranged to cut a slight groove or recess in the under side of the material, while the horizontally-rotating saws 34 are adapted to cut channels or grooves in the sides of the blocks or material; but other tools may be substituted for the saws shown and other operations accomplished. The machine shown is adapted for cutting off and grooving boards used in the manufacture of photographic cameras. If the saws or other tools 32 32× were arranged above the table or work-support, it would not be absolutely necessary that a movable work-clamp be employed, as the post 12 would serve as a stop for the rear of the material operated upon, while the spring-operated gage 27 would hold it against the stop, and when released or removed from in front of the work the retaining-arms 31 would hold the latter; but I prefer the arrangement shown for obvious reasons.

The machine as constructed is preferably adapted for light woodwork, but of course may be variously modified to accomplish other desired results, and while I prefer the construction shown I do not desire to be confined to precisely the details, as other modifications will readily occur to those skilled in the art. The clutch devices, for instance, could be used on other machines than that shown herein.

I claim as my invention—

1. The combination with a support and operating-tools thereon, of a relatively movable work-table, an automatic work-clamp moving with the latter operating when the table is moved in one direction to hold the work on the table, mechanism for reciprocating the table past the operating-tools, an automatic retaining device beyond the tools for holding the work stationary when the clamp is released and the table is moving in one direction.

2. The combination with a support and operating-tools thereon, of a work-table reciprocating on the support relative the tools, a stop on the table with which the work engages, a spring-operated gage holding the work against the stop and movable with it beyond the tools, and means for removing the gage from the work after it has passed the tools.

3. The combination with a support and operating-tools thereon, of a relatively reciprocating work-table, a stop thereon with which the work engages, a spring-operated gage holding the work against the stop and movable with it beyond the tools, means for removing the gage from the work and retaining devices for holding the work stationary after the gage is removed during the return movement of the table.

4. The combination with a support and operating-tools thereon, of a relatively reciprocating work-table, a stop on the table, a spring-operated gage engaging the work to move it against the stop, means for moving the gage vertically out of the path of the work, and work-retaining devices arranged stationary relative the table for holding the work after the release of the gage during the return movement of the table.

5. The combination with a support and operating-tools thereon, of a work-table reciprocating on the support relative the tools, a work-stop on the table, and a rod extending above the table and movable therewith, the gage on the rod operating to hold the work against the stop, and a stationary abutment engaged by the rod to release the gage.

6. The combination with the reciprocating work-table and the vertically-movable work-clamp on the table, of the reciprocating lever actuating the table and opening and closing the clamp, and a stop for limiting the opening movement of the clamp.

7. The combination with the reciprocating work-table, the standard 12, the vertically-movable clamp 15 and the lever 17 connected thereto, of the yoke 18, the link 19, connected to the lever and means for moving the latter in opposite directions.

8. The combination with the stationary support and the arbor and tools thereon, of the reciprocating skeleton work-table, the removable sections 10 therein, the work-clamp on the work-table, and operating devices connected to the clamp for operating the clamp and reciprocating the table.

9. The combination with the stationary table, the arbor 33, the saws 32 on the arbor, and the gage 90, of the reciprocating work-table, a work-clamp thereon, and an actuating member connected to the clamp and operating by a single movement in one direction to operate the clamp and actuate the work-table.

10. The combination with the table, the arbor 33, the saws 32 on the arbor, and the gage 90, of the reciprocating work-table, the work-clamp thereon, an actuating member connected to the clamp and operating by a single movement in one direction to operate the clamp and actuate the work-table, and a work-retainer for engaging the work after it is moved beyond the saws.

11. The combination with the reciprocating work-table having a stationary work-stop thereon, the rod 25, and the gage 27 thereon, of the slotted plate 30, the plate 29, and the adjustable spring-arms 31 thereon, substantially as described.

12. The combination with the stationary table, the arbor 33 and tools carried thereby, the frame 36 adjustable on the table having the adjustable vertical arbors 44 and tools thereon, of the reciprocating work-table, a work-clamp thereon, actuating devices for the clamp operating through the latter to operate the table in opposite directions, and automatic work-retaining devices on the stationary table for holding the work after passing the operating-tools, substantially as described.

13. The combination with the stationary table, the arbor 33 and tools thereon, the frame 36, adjustable on the table, the vertical shafts adjustable on the frame having the pulleys, the shaft 44 on the frame, the drum 42 and pulley 41 thereon, belts connecting the drum and the pulleys on the vertical shafts, a belt connecting the arbor 33 and pulley 41, and a tightener for said belt, substantially as described.

FRANK A. BROWNELL.

Witnesses:
F. F. Church,
G. A. Roda.